Nov. 18, 1924.
B. D. THOMAS
AIRPLANE UNDERCARRIAGE
Filed Nov. 21, 1922   3 Sheets-Sheet 1
1,516,357
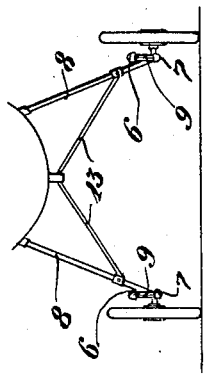
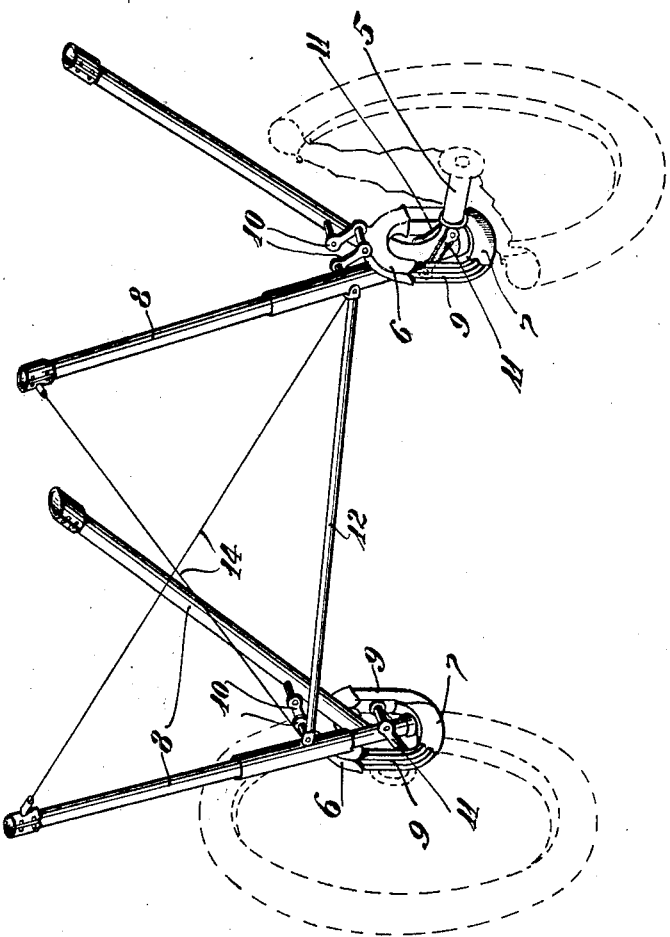
INVENTOR
Benjamin Douglas Thomas
BY
Edward Wright ATTORNEY

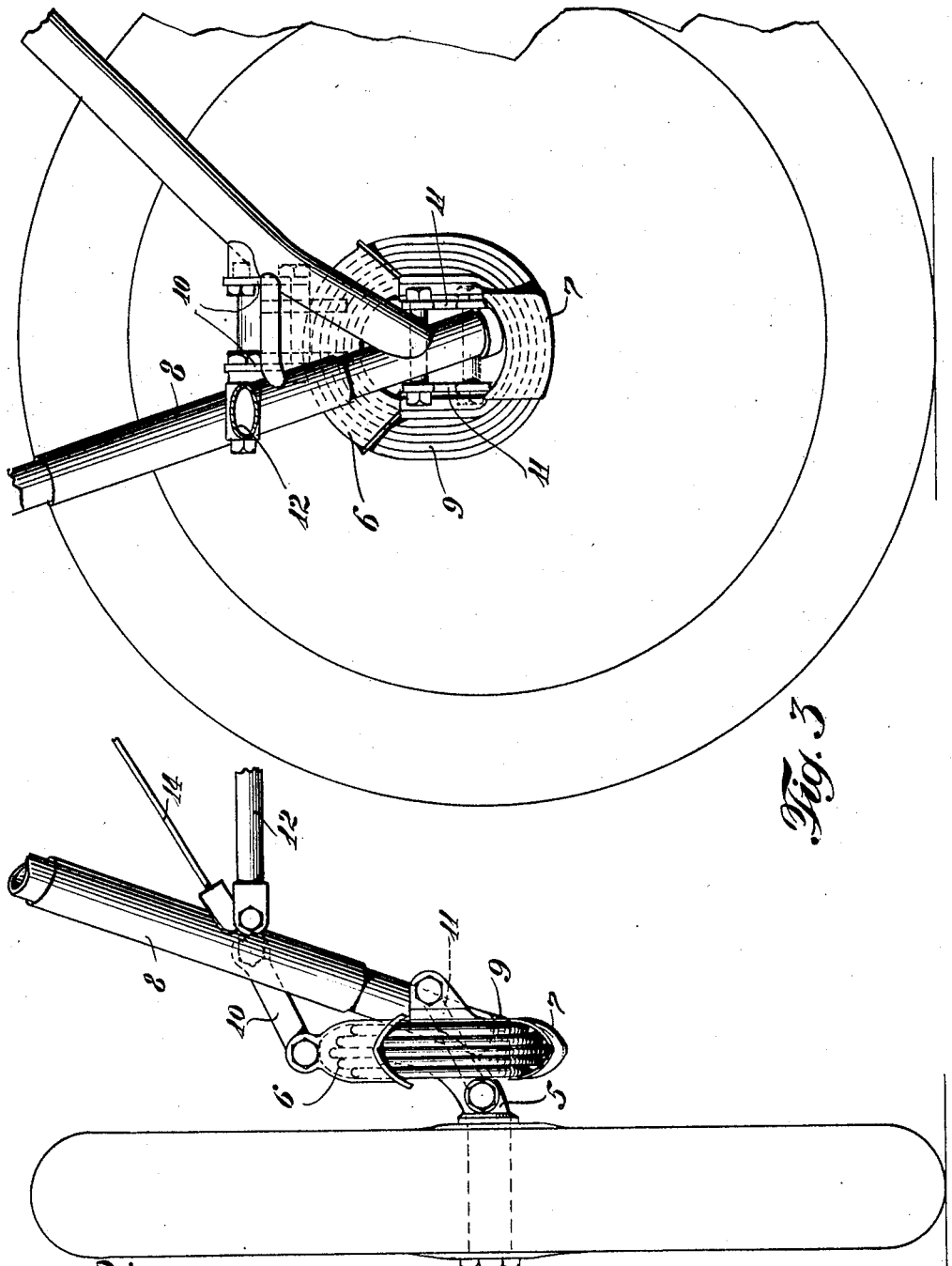

Nov. 18, 1924.

B. D. THOMAS

AIRPLANE UNDERCARRIAGE

Filed Nov. 21, 1922

1,516,357

3 Sheets-Sheet 3

Inventor
Benjamin Douglas Thomas
By Attorney
Edward H. Wright

Patented Nov. 18, 1924.

1,516,357

UNITED STATES PATENT OFFICE.

BENJAMIN DOUGLAS THOMAS, OF ITHACA, NEW YORK, ASSIGNOR OF ONE-TENTH TO THOMAS-MORSE AIRCRAFT CORPORATION, OF ITHACA, NEW YORK, A CORPORATION OF NEW YORK.

AIRPLANE UNDERCARRIAGE.

Application filed November 21, 1922. Serial No. 602,332.

*To all whom it may concern:*

Be it known that I, BENJAMIN DOUGLAS THOMAS, a subject of the King of Great Britain, residing at Ithaca, in the county of Tompkins and State of New York, have invented a certain new and useful Improvement in Airplane Undercarriages, of which improvement the following is a specification.

This invention relates to the under carriage for airplanes, and has for its principal object to provide a simple, light, and compact shock absorbing connection between the frame and the axle to secure substantial vertical displacement of the wheels under load, and to reduce to a minimum the lateral stresses on the wheels. Another object is to provide increased clearance beneath the axle for permitting landing on rough or unprepared fields without danger of nosing over. Still another object is to enclose the shock absorbing mechanism to protect the same and reduce the air resistance. These and other objects will more fully appear from the following description and claims.

Figure 5:
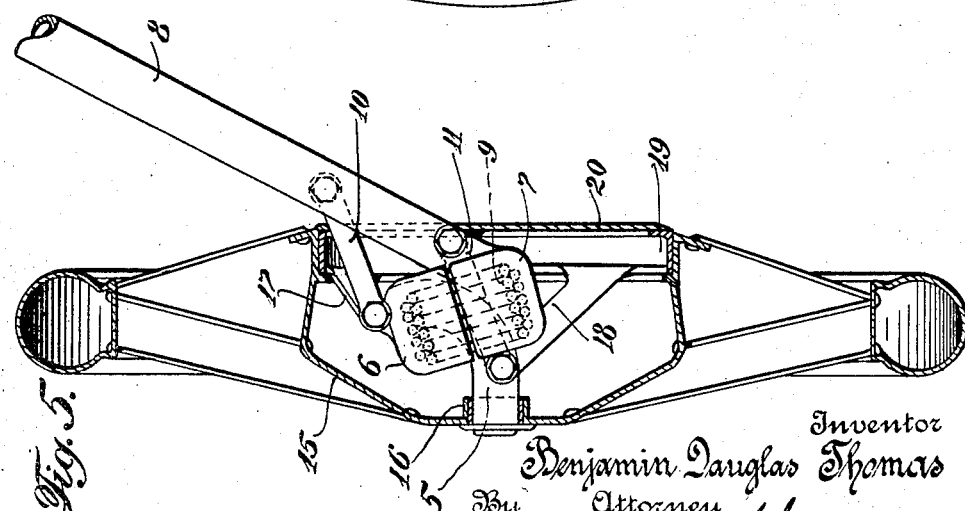

In the accompanying drawings: Figure 1 is a perspective view of an under carriage embodying my improvement; Fig. 2, a front elevation of one side of the carriage showing the improved connection to the wheel; Fig. 3, a side elevation of the same; Fig. 4, a front elevation, on a smaller scale, illustrating a modification of cross bracing; Fig. 5, a transverse section of a wheel showing a modification with the shock absorber enclosed within the wheel; and, Fig. 6, an inside elevation of the same with the cover plate removed.

In the practice of my invention, the usual continuous axle from wheel to wheel of the under carriage is eliminated, and the short axle, 5, of each wheel is curved upward and welded to an upper shock absorber housing or guard, 6. The usual V type side members or struts, 8, of the frame are employed, and at the lower end of the forward strut is welded the lower shock absorber housing or guard, 7. An elastic cord, 9, is wound through the upper and lower guards, 6 and 7, and that portion of the cord between the two guards is preferably covered with detachable stream-line covers, thus providing protection for the shock absorber from mud and water.

In order to provide for a substantially parallel movement of the respective shock absorber casings, and for a vertical displacement of the wheels when the elastic cord is stressed under load, a linkage, 10, is connected at its upper end to the side struts and at its lower end to the top of the upper guard, 6, and another similar linkage, 11, is pivotally connected at its inner and upper end to bosses formed on the lower portion of the side struts, and at its lower and outer end to the axle, 5, close to the inside of the wheel hub.

By means of this construction during the flexing of the shock absorber, the parts are maintained in substantial parallel relation with the wheels vertical.

Figure 6:
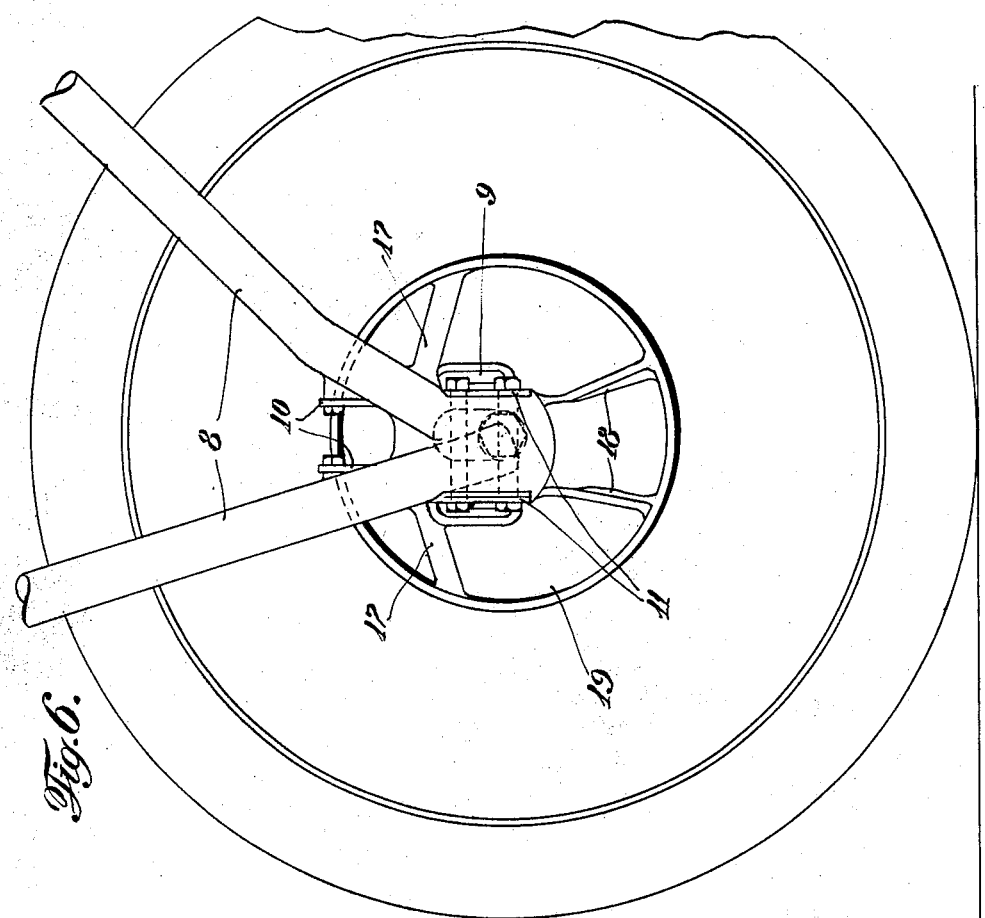

In the modification shown in Figs. 5 and 6, the shock absorbing mechanism is similar to that above described, but the same is enclosed with a casing, 15, forming the hub portion of the wheel. In this case the axle, 5, has a bearing, 16, at its outer end in the hub casing, 15, and is connected through the bracket arms, 17 and 18, with the ring, 19, which is mounted in a bearing at the inner side of the casing, 15. The shock absorber guards or saddles, 6 and 7, are shown as inclined slightly to a vertical plane, but substantially parallel with the movement of the struts as guided by the linkage. There is also a cover plate, 20, for closing the casing, 15, at the inner side of the wheel around the struts, thus providing complete protection for the shock absorber mechanism. By means of enclosing this mechanism within the hub casing, the air resistance of the parts which would otherwise be exposed, is materially reduced.

According to another feature of my improvement, I provide a horizontal brace, 12, connecting the opposite forward struts, 8, 8, at a point somewhat above the axis of the wheels, thus increasing the clearance beneath the frame to permit landing on rough ground.

As shown in Fig. 4, this lateral brace may be formed in two parts, 13, 13, inclined upwardly and connecting at the bottom of the fuselage. The diagonal cross wires, 14, 14, also connect the forward struts for producing a truss effect to brace the under carriage against lateral stresses.

It will now be seen that my improvement provides a spring action or shock absorber for permitting relative vertical displacement of the wheels when striking the ground in landing, thereby relieving the machine from sudden shocks and jars, and reducing the liability of accidents in landing.

Having now described my invention, what I claim as new and desire to secure by Letters Patent is:

1. In an airplane under carriage, the combination with side struts and a pair of wheels, of a separate axle for each wheel, an upper semi-circular shock absorber guard connected to each axle, a lower semi-circular guard connected to the side strut at each side, and an elastic cord shock absorber wound through said upper and lower guards.

2. In an airplane under carriage, the combination with side struts and a pair of wheels, of a separate axle for each wheel, said axles being bent upwardly at their inner ends, a shock absorber guard rigidly secured to the upper end of each axle, another guard secured to the side strut below the axis of the wheel, and an elastic cord shock absorber connecting said upper and lower guards.

3. In an airplane under carriage, the combination with side struts and a pair of wheels, of separate axles for each wheel, said axles being turned upwardly at their inner ends, a linkage connection between the upper end of each axle and its supporting struts, and another linkage connection between the lower portion of said struts and said axle.

4. In an airplane under carriage, the combination with side struts and a pair of wheels, of a separate axle for each wheel, a shock absorber guard secured to said axle, another shock absorber guard secured to its supporting struts, an elastic shock absorber connecting said guards, and a linkage connection between said struts and axles.

5. In an airplane undercarriage, the combination with a strut and a wheel having a hub casing, of an axle having a bearing at one end in said casing, a ring having a bearing in said casing, and connected to said axle, and a shock absorber mechanism enclosed within said casing and connecting the axle to said strut.

6. In an airplane undercarriage, the combination with a strut and a wheel having a hub casing, of an axle having a bearing at one end in said casing, a ring having a bearing at the inside end of said casing and connected to said axle, a shock absorber mechanism enclosed within the casing and connecting the axle to the strut, and a cover for the inside end of the casing.

7. In an airplane undercarriage, the combination with side struts and stub wheel axles, of an upper shock absorber housing secured to the inner end of each axle, a similar housing secured to the lower end of the struts on each side, yieldable means between said housings, and means to ensure a substantially parallel movement of said housings.

8. In an airplane undercarriage, the combination with side struts and stub wheel axles, of an upper shock absorber housing secured to the inner end of each axle, a similar housing secured to the lower end of the struts on each side, elastic means in said housings, a linkage connecting the upper housing to the struts, and a linkage connecting the axle to said struts, whereby the relative movement of said housings is maintained parallel and that of the axles is kept vertical.

In testimony whereof I have hereunto set my hand.

BENJAMIN DOUGLAS THOMAS.